Figure 1:
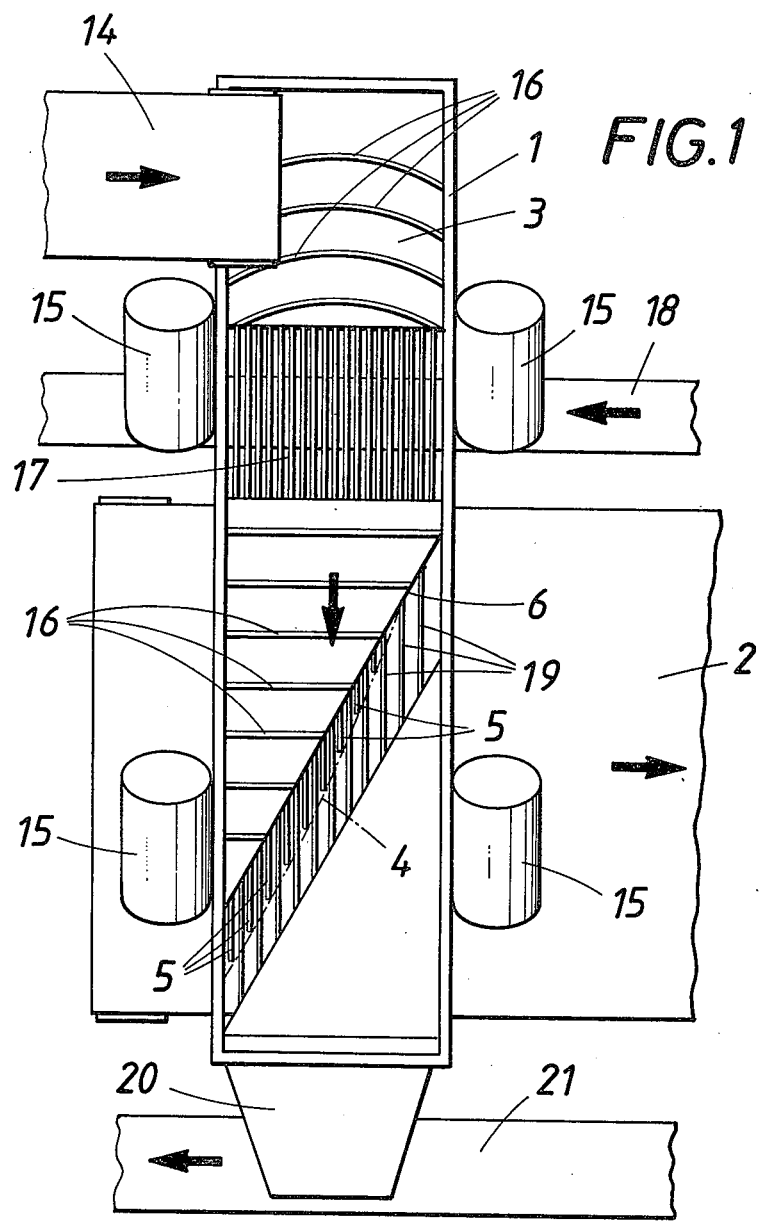

United States Patent [19]

Nagl

[11] Patent Number: 4,457,840

[45] Date of Patent: Jul. 3, 1984

[54] APPARATUS FOR DELIVERING A STREAM OF GREEN PELLETS

[75] Inventor: Martin Nagl, Rutzenmoos, Austria

[73] Assignee: Voest-Alpine Aktiengesellschaft, Linz, Austria

[21] Appl. No.: 382,582

[22] Filed: May 27, 1982

[30] Foreign Application Priority Data

Jul. 27, 1981 [AT] Austria ............................... 3294/81

[51] Int. Cl.³ ........................ B07B 1/40; B07B 11/06; B65G 47/20
[52] U.S. Cl. .................................... 209/257; 209/320; 198/502; 198/614; 198/771; 266/178; 75/5; 222/196
[58] Field of Search ............... 209/236, 240, 247, 254, 209/320, 920, 257; 198/502, 503, 505, 614, 771; 222/199, 200, 196; 266/178–180; 75/5

[56] References Cited

U.S. PATENT DOCUMENTS

| | | | |
|---|---|---|---|
| 2,737,295 | 3/1956 | Symons | 209/254 |
| 3,524,533 | 8/1970 | Miller et al. | 198/711 |
| 3,877,585 | 4/1975 | Burgess | 198/36 |
| 3,889,796 | 6/1975 | Baily et al. | 198/502 |
| 3,915,283 | 10/1975 | Munck | 209/247 |

FOREIGN PATENT DOCUMENTS

| | | | |
|---|---|---|---|
| 267236 | 5/1965 | Australia | 198/502 |
| 2839996 | 6/1979 | Fed. Rep. of Germany | 198/614 |
| 415212 | 6/1974 | U.S.S.R. | 222/199 |
| 583062 | 12/1977 | U.S.S.R. | 222/200 |

Primary Examiner—David L. Lacey
Attorney, Agent, or Firm—Kurt Kelman

[57] ABSTRACT

An apparatus for delivering a stream of green pellets has a wide belt conveyor and a vibrating conveyor having a deck for supporting the green pellets and conveying the green pellets to the wide belt conveyor in a direction of conveyance over a discharge edge. The discharge edge has an adjustable configuration and extends at an acute angle to the conveyance direction across the conveyance surface of the wide belt conveyor whereby the green pellets discharged over the edge form a layer on the conveyance surface. A plurality of parallel deck bars are axially slidably connected to the vibrating conveyor deck and have end portions protruding therefrom in the conveyance direction, the protruding deck bar ends defining the discharge edge. The deck bars are connected to drives for axially sliding the deck bars for adjusting the discharge edge configuration.

6 Claims, 4 Drawing Figures

APPARATUS FOR DELIVERING A STREAM OF GREEN PELLETS

This invention relates to apparatus for charging a traveling grate with green pellets, comprising a wide belt conveyor and a vibrating conveyor which precedes the wide belt conveyor and has a vibrating deck having a discharge edge. The discharge edge defines an acute angle with the direction of conveyance of the vibrating conveyor, extends over the width of the conveying surface of the wide belt conveyor and has an adjustable configuration.

Green pellets made from ground and moistened ore on drums or rotating plates are fired on a traveling grate, for which purpose they should be distributed thereon as uniformly as possible so that the layer of pellets is as uniformly permeable to gas as possible. Because the green pellets have a relatively low compressive strength, their uniform distribution on the traveling grate is not easily achieved. For this reason, the green pellets are first charged onto a wide belt conveyor, the conveying surface of which has the same width as that of the traveling grate, and are delivered from this wide belt conveyor onto the traveling grate which may be preceded by a roller conveyor. To ensure a uniform distribution of the green pellets on the wide belt conveyor, a distributor is provided which consists of a vibrating conveyor with a discharge edge that defines an acute angle with the direction of conveyance of the vibrating conveyor and extends over the width of the conveying surface of the wide belt conveyor so that the narrow stream of material conveyed by the vibrating conveyor can be distributed by the discharge edge to form a wider stream. Such an apparatus produces an improved distribution in a simpler manner compared to other distributors having oscillating belt conveyors but the resulting distribution of the thickness of the layer of green pellets across the width of the wide belt conveyor and the width of the traveling grate is still irregular. For this reason, it has been proposed to provide a discharge edge having an adjustable polygonal configuration formed by plates which can be adjusted, as required, to change the configuration of the discharge edge. That structure defining an adjustable discharge edge has the disadvantage that, owing to the required length of the plate, the adjustment of the configuration of the discharge edge is rather restricted and a relatively expensive structure is required.

It is an object of the invention to avoid these disadvantages and so to improve apparatus of the kind described first hereinbefore for charging a traveling grate with green pellets that the configuration of the discharge edge can be adjusted by a simple structure.

This object is accomplished according to the invention with a vibrating conveyor whose deck is extended in the direction of conveyance by parallel deck bars which are axially slidably mounted and have protruding end portions defining the discharge edge. The configuration of the discharge edge can accordingly be adjusted in relatively small steps by an axial displacement of the deck bars. The slidable mounting of the deck bars on the underside of the vibrating deck can be effected with simple structural means so that the requirement for structural simplicity is met. Obviously, the clearances between adjacent deck bars must be small enough to avoid an uncontrolled discharge of green pellets before they reach the discharge edge. A preceding fine screen may be used to remove undesired fines from the green pellets.

Figure 2:
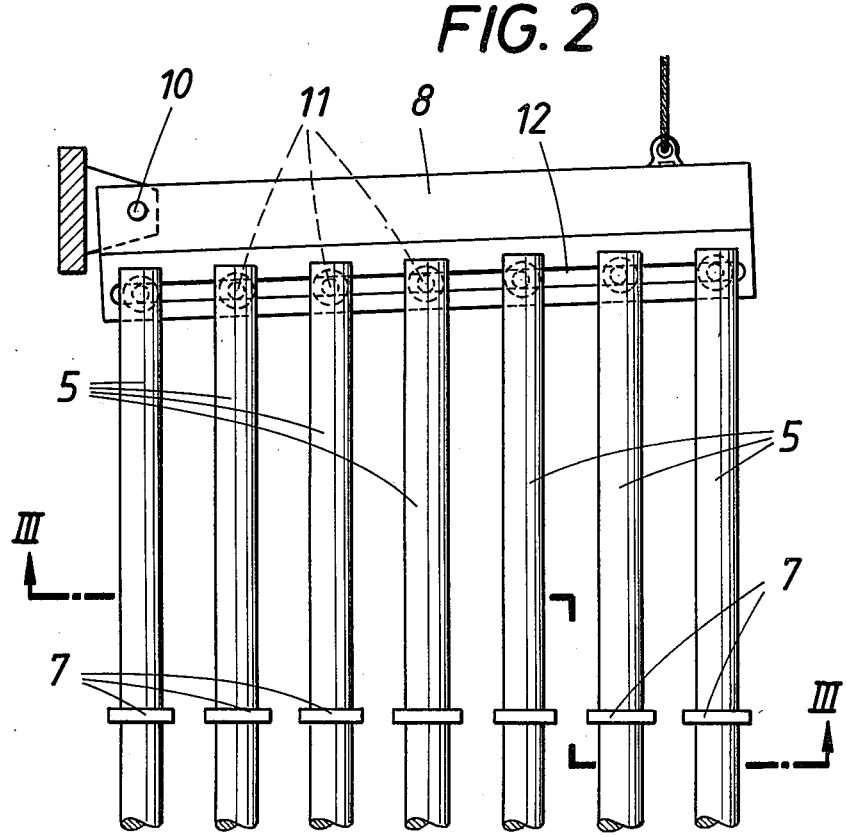
Figure 3:
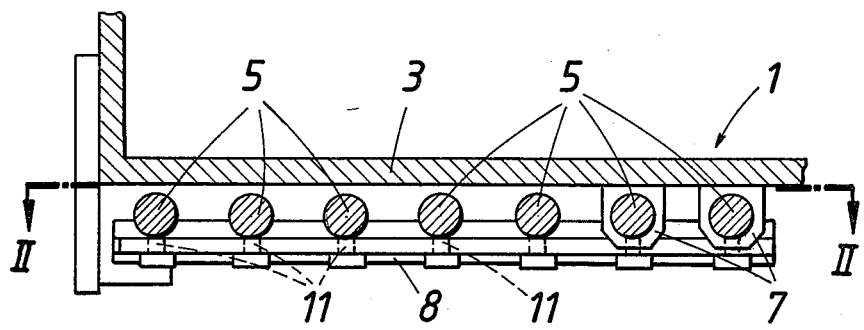
Figure 4:
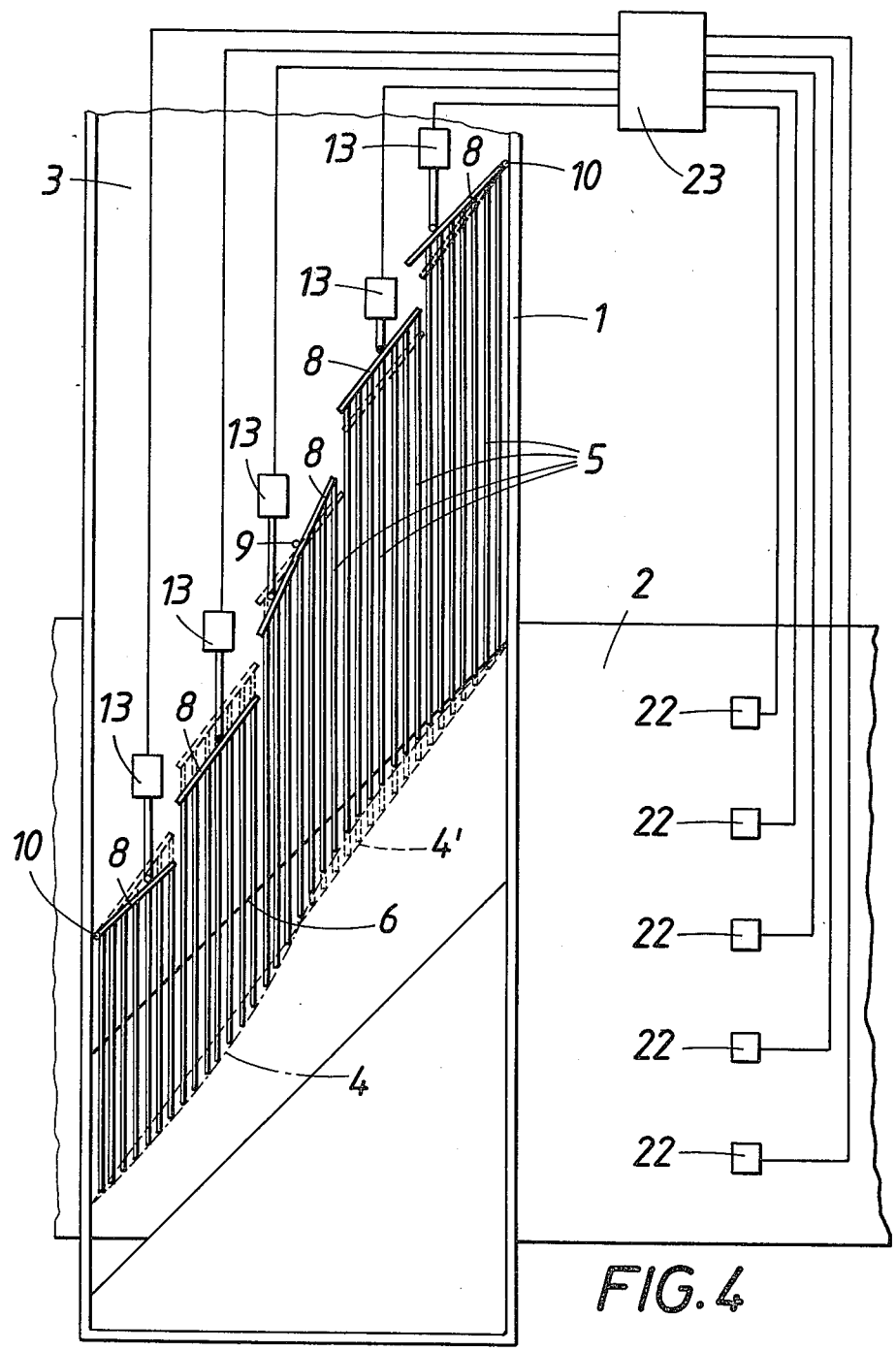

An embodiment of the invention is shown by way of example on the drawing, in which FIG. 1 is a diagrammatic top plan view showing apparatus according to the invention for charging a traveling grate with green pellets, FIG. 2 is an enlarged sectional view taken on line II—II in FIG. 3 and show how groups of deck bars are pivoted to respective crossbars, FIG. 3 is an enlarged transverse sectional view taken on line III—III in FIG. 2 and shows the vibrating conveyor, and FIG. 4 is a block circuit diagram of the circuit for controlling the positioning drive means for adjusting the deck bars.

As is particularly apparent from FIG. 1, the illustrated apparatus for charging a traveling grate with green pellets comprises a vibrating conveyor 1 feeding the pellets to a succeeding wide belt conveyor 2. The arrangement is such that deck 3 of vibrating conveyor 1 terminates in a discharge edge 4 which extends at an acute angle to the direction of conveyance of vibrating conveyor 1 and extends across the width of the conveying surface of the wide belt conveyor.

According to this invention, the discharge edge 4 is defined by parallel slidable deck bars 5 which have end portions protruding from an oblique terminal edge 6 of deck 3 so that discharge edge 4 is effectively defined by the curve connecting the protruding ends of the deck bars 5 as indicated in phantom lines in FIG. 1.

As shown in FIGS. 2 and 3, bearing lugs 7 slidably mount deck bars 5 on the underside of the deck 3 of the vibrating conveyor 1 and have bearing bores which receive the deck bars 5. As a result, deck bars 5 can be axially adjusted to protrude different distances from the terminal edge 6 of the deck plate 3. For this purpose, groups of deck bars 5 are pivoted by pivot pins 11 to respective crossbars 8, and as indicated in FIG. 4, each crossbar 8 is either pivoted on pivot 9 disposed at the center or on pivot 10 disposed at one end of the crossbar or the crossbar can be displaced parallel to itself. Pivot pins 11 must be mounted to permit a movement of the pivot pins relative to the crossbars 8 during a pivotal movement of the latter. In the embodiment shown by way of example, this requirement is met by the provision of a slot 12 which slidably receives pivot pins 11. Positioning drives 13 enable groups of deck bars 6 to be axially adjusted. These drives 13 may consist of stepping motors or of fluid-operable cylinders.

The green pellets to be fired are fed by a feeding belt conveyor 14 to the vibrating conveyor 1 which has vibrating motors 15 for imparting vibrations to the conveyor to move the green pellets toward the discharge edge 4. Upwardly protruding distributing bars 16 which extend transversely to the direction of conveyance are provided on deck plate 3 to ensure that the green pellets are distributed as quickly and uniformly as possible over deck plate 3 of the vibrating conveyor 1. A fine sieve 17 is incorporated in the deck plate 3 and serves to eliminate the undesired fines, which are removed by a belt conveyor 18. The green pellets move over fine sieve 17 to discharge edge 4 which is defined by the protruding end portions of deck bars 5 and distributes the relatively narrow stream of pellets on the vibrating conveyor 1 over the width of the conveying surface of wide belt conveyor 2. If deck bars 5 interdigitate with sieve bars 19, which constitute a coarse sieve, as is shown in FIG.

1, an upper limit for the particle size of the green pellets delivered to wide belt conveyor 2 may be defined. In this manner, the clearance between the deck bars may be increased by the width of the sieve bars so that more space is available for mounting each deck bar. Besides, fewer deck bars having a given width are required. The coarse sieve defines a maximum particle size for the green pellets which are delivered to the traveling grate. Finally, the array of coarse sieve bars and deck bars arranged in alternation stiffens the vibrating conveyor so that the distribution of the green pellets is further improved. The oversized pellets are discharged through a discharge hopper 20 onto a belt conveyor 21.

Because the configuration of discharge edge 4 determines the distribution of the green pellets across the width of the conveying surface of the wide belt conveyor 2, the distribution can be changed by a change of the configuration of discharge edge 4. For this purpose and as shown in FIG. 4, the thickness of the layer of green pellets is measured in several locations along the width of the conveying surface of the wide belt conveyor by measuring devices, e.g., ultrasonic detectors 22, which transmit signals representing the measured values to a controller 23. The latter compares these actual value signals with predetermined reference signals and controls the various drives 13 in dependence on the difference between the actual-value signals and the reference signals. It has been assumed in the example shown in FIG. 4 that the green pellets discharged from a straight discharge edge 4', indicated by a dotted line, will form a layer which decreases in thickness from the edges to the center on the wide belt conveyor. To obtain a layer of constant height across the width of the conveying surface, the discharge edge must define a smaller angle with the direction of conveyance adjacent the edges and a larger angle in the central region. For this reason, the groups of deck bars 5 associated with respective detectors 22 are advanced or retracted accordingly by an adjustment of the crossbars 8 until the deck bars have assumed the position indicated by a solid line and define the corrected discharge edge 4. It is apparent that any change occurring in the distribution of the thickness of the layer of green pellets on wide belt conveyor 2 can be compensated by controller 23 in dependence on the difference between the actual-value signals and the reference signal so that the wide belt conveyor 2 delivers the pellets to the traveling grate in a substantially uniform layer.

The deck bars can be adjusted for a constant distribution by the vibrating conveyor or to change the thickness distribution of the layer of green pellets on the wide belt conveyor since the deck bars are connected to positioning drive means controlled in dependence on the distribution of the thickness of the layer of green pellets across the width of the conveying surface of the wide belt conveyor. For instance, if the distribution of the pellets on the vibrating conveyor is changed as a result of an irregular feeding of the green pellets onto the vibrating conveyor, the thickness of the layer on the wide belt conveyor will be changed in certain regions. In that case, that portion of the discharge edge which is associated with that region must be re-adjusted. It will be sufficient to properly adjust those deck bars which are associated with said region. Irregularities in the distribution of the thickness of the layer can thus easily be compensated by the automatic control. As the adjusted portion of the discharge edge usually comprises a plurality of deck bars, the deck bars are connected in groups to the positioning drive. These groups of deck bars still define a finely stepped configuration of the discharge edge.

What is claimed is:

1. An apparatus for delivering a stream of green pellets, which comprises
    (a) a wide belt conveyor having a conveyance surface and
    (b) a vibrating conveyor having a deck for supporting green pellets and positioned and arranged with respect to the wide belt conveyor so as to convey green pellets to the wide belt conveyor in a direction of conveyance over a discharge edge, the discharge edge having an adjustable configuration and extending at an acute angle to the conveyance direction across the conveyance surface of the wide belt conveyor whereby green pellets discharged over the edge form a layer on the conveyance surface,
    (c) a plurality of parallel deck bars axially slidably connected to the vibrating conveyor deck and having end portions protruding therefrom in the conveyance direction, the protruding deck bar ends defining the discharge edge, and
    (d) means for axially sliding the deck bars for adjusting the discharge edge configuration.

2. The apparatus of claim 1, further comprising a plurality of parallel sieve bars extending in the conveyance direction across the conveyance surface of said wide belt conveyor, the deck bars and the sieve bars being alternately positioned with respect to each other.

3. The apparatus of claim 1, further comprising means for detecting the thickness of a layer of green pellets on the conveyance surface of the wide belt conveyor at a plurality of points spaced across the conveyance surface, and positioning device means operatively connected to the deck bars for axially sliding the deck bars for adjustment of the protruding end portions thereof, control means operatively connected to said detecting means and said drive means in order to control the operation of said drive means in response to the thickness-detecting means.

4. The apparatus of claim 3, wherein the deck bars are arranged in groups and the positioning drive means comprises a plurality of positioning drives each of which is connected to a respective one of the groups of deck bars for common adjustment of the deck bars in each group.

5. The apparatus of claim 4, wherein each one of the positioning drives comprises a cross bar to which the respective group of deck bars is affixed.

6. The apparatus of claim 4, wherein the thickness-detecting means comprises a thickness detector at each one of the points and each one of the thickness detectors is operatively connected to a respective one of the positioning drives.

* * * * *